United States Patent
Simpson et al.

(10) Patent No.: US 7,145,692 B2
(45) Date of Patent: Dec. 5, 2006

(54) SYSTEM AND METHOD FOR FACILITATING COLOR ADJUSTMENT OF IMAGING DATA

(75) Inventors: Shell Sterling Simpson, Boise, ID (US); Ward Scott Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 981 days.

(21) Appl. No.: 10/071,773

(22) Filed: Feb. 7, 2002

(65) Prior Publication Data

US 2003/0147089 A1    Aug. 7, 2003

(51) Int. Cl.
*B41J 1/00*     (2006.01)
*G06F 15/00*   (2006.01)
*G06F 9/00*     (2006.01)
*G03F 3/08*     (2006.01)

(52) U.S. Cl. ............... 358/1.9; 358/518; 382/162; 382/167

(58) Field of Classification Search ............... 358/1.15, 358/1.9, 1.1, 1.6, 1.13, 518, 1.16; 399/54; 345/593–595, 748, 700, 733, 737, 961–978, 345/740, 326–358; 705/410, 408; 382/162, 382/167
See application file for complete search history.

(56) References Cited

U.S. PATENT DOCUMENTS

| | | | |
|---|---|---|---|
| 6,342,952 B1* | 1/2002 | Chan | 358/1.9 |
| 2002/0054350 A1* | 5/2002 | Kakigi et al. | 358/1.16 |
| 2003/0140017 A1* | 7/2003 | Patton et al. | 705/410 |

* cited by examiner

*Primary Examiner*—Kimberly Williams
*Assistant Examiner*—Charlotte M. Baker

(57) ABSTRACT

The present disclosure relates to a system and method for facilitating color adjustment of imaging data. In one arrangement, the system and method pertain to accessing imaging data to be printed, prompting a user to select an area to be adjusted and a color that the area is desired to be, receiving the area and color selections, and adjusting the color of the area as desired.

11 Claims, 9 Drawing Sheets

SYSTEM AND METHOD FOR FACILITATING COLOR ADJUSTMENT OF IMAGING DATA

FIELD OF THE INVENTION

The present disclosure relates to a system and method for facilitating color adjustment of imaging data. More particularly, the disclosure relates to a web-based imaging system and method with which users can adjust one or more colors in a document prior to printing.

BACKGROUND OF THE INVENTION

Color printing has become more popular in recent years due in part to the increased availability of inexpensive color printers. Color documents can be created, for example, with many commercially available programs such as word processing applications (e.g., Microsoft Word™), drawing applications (e.g., Microsoft Paint™), and so forth.

Although providing acceptable results for relatively casual printing, undesired results can occur where such applications are used to print color documents with high precision. For example, where a document is to include a company logo that incorporates a trademarked shade of color, the printed document may not represent the color with exactitude, even where the user selected the color with specificity, for example by specifying a specific named color (e.g., Pantone™ color). One potential reason for this phenomenon is that one or more translations occur between the application and the printing device. For instance, one such translation occurs between the application and the operating system in describing the colors contained in the document. Another translation can occur between the operating system, for instance a graphical device interface (GDI) of the operating system, and the printing device driver. Because of these translations, there is potential for inaccurately representing one or more colors the user selected. This is particularly true where the color is a precise, predefined color.

Although there are software applications available that communicate colors with precision to printing devices, these applications tend to be expensive and difficult to learn. Accordingly, it can be appreciated that it would be desirable to have a system and method which allows the user to adjust colors prior to printing so that the exact desired colors will appear in the printed document.

SUMMARY OF THE INVENTION

The present disclosure relates to a system and method for facilitating color adjustment of imaging data. In one arrangement, the system and method pertain to accessing imaging data to be printed, prompting a user to select an area to be adjusted and a color that the area is desired to be, receiving the area and color selections, and adjusting the color of the area as desired.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed is a system and method for facilitating color adjustment of imaging data. In some arrangements, the system has a distributed architecture with which a user can maintain imaging data to be added to a printed document. In a such a scenario, the user accesses a network-based or web-based imaging service that enables the user to access the imaging data in the user's personal imaging repository, as well as arrange the imaging data as desired. Once the arrangement has been selected, a document can be stored in the user's personal imaging repository and, if desired, one or more hard copy documents can be generated using a network-based or web-based printing service.

To facilitate description of the inventive system and method, example systems are discussed with reference to the figures. Although these systems are described in detail, it will be appreciated that they are provided for purposes of illustration only and that various modifications are feasible without departing from the inventive concept. After the description of the example systems, examples of operation of the systems are provided to explain the manners in which users can adjust colors in a document before printing it.

Figure 1:
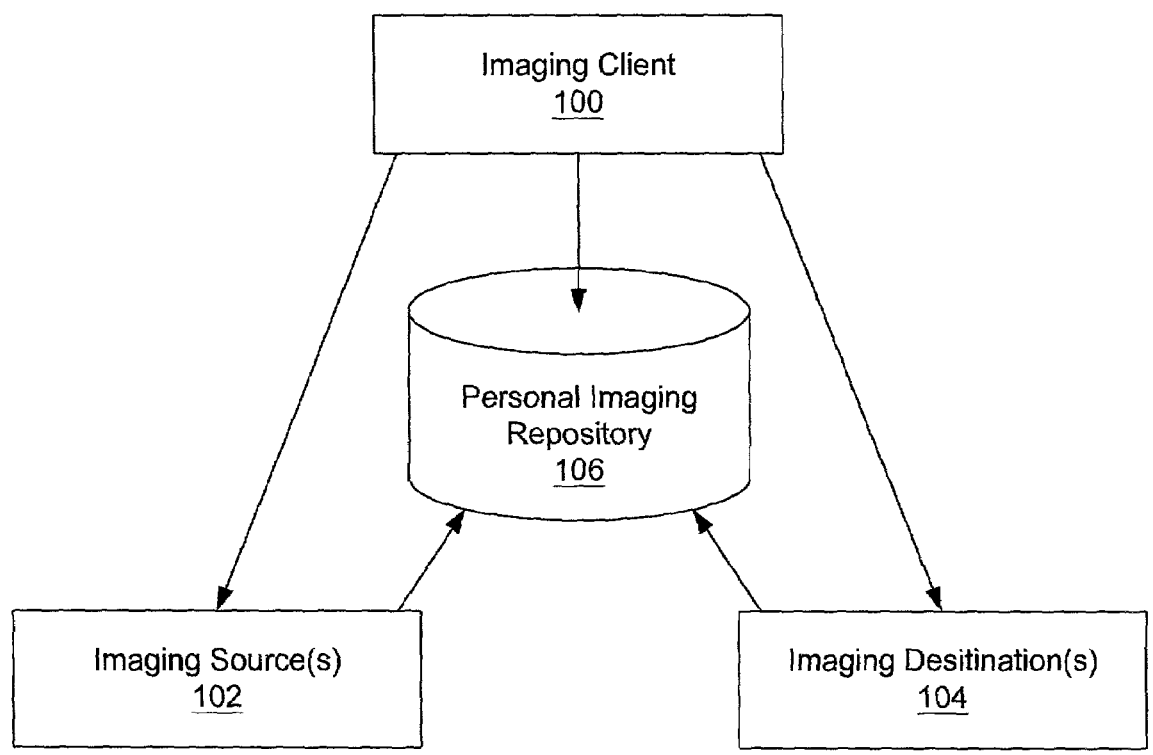
FIG. 1 is a schematic representation of the general operation of the invention.

FIG. 1 is a schematic representation of the general operation of the invention. As shown in this figure, an imaging client 100 communicates with one or more imaging sources 102, one or more imaging destinations 104, and a personal imaging repository 106. The imaging source(s) 102 represent any of a wide variety of devices/services that can be accessed by the imaging client 100 and used to select or identify imaging data to be used to create a document.

The personal imaging repository 106 provides image storage facilities that typically are personalized for the individual imaging client 100. The imaging repository 106 can be located in various different places. For example, the repository 106 can be maintained on one or more computing devices associated with the imaging client 100, imaging source(s) 102, or imaging destination(s) 104. Alternatively, the repository 106 can be maintained on a separate computing device (e.g., server) that the imaging client 100, imaging source(s) 102, and imaging destination(s) 104 can access. The imaging data in the imaging repository 106 can be any type of printable data, such as text, graphics, frames of video or animations, pictures, combinations thereof, and so forth.

Once imaging data are stored in the personal imaging repository 106, the imaging client 100 can select data from the repository that are to be communicated to the imaging destination(s) 104 for some form of processing or manipulation. By way of example, the data are communicated to the image destination(s) 104 for color adjustment. Where the imaging destination(s) 104 are adapted for printing, they may comprise any of a wide variety of printing devices that are capable of generating hard copy documents, such as printers, multifunction peripherals (MFPs), plotters, services managing printing devices, and so on.

As will be apparent from the discussions that follow, the above-described manner of operation provides a high degree of personalization to the imaging client 100. Specifically, in that the client's personal information can be accessed and utilized with any participating service (e.g., web site) used by the client, each service can be customized for the user.

Figure 2:
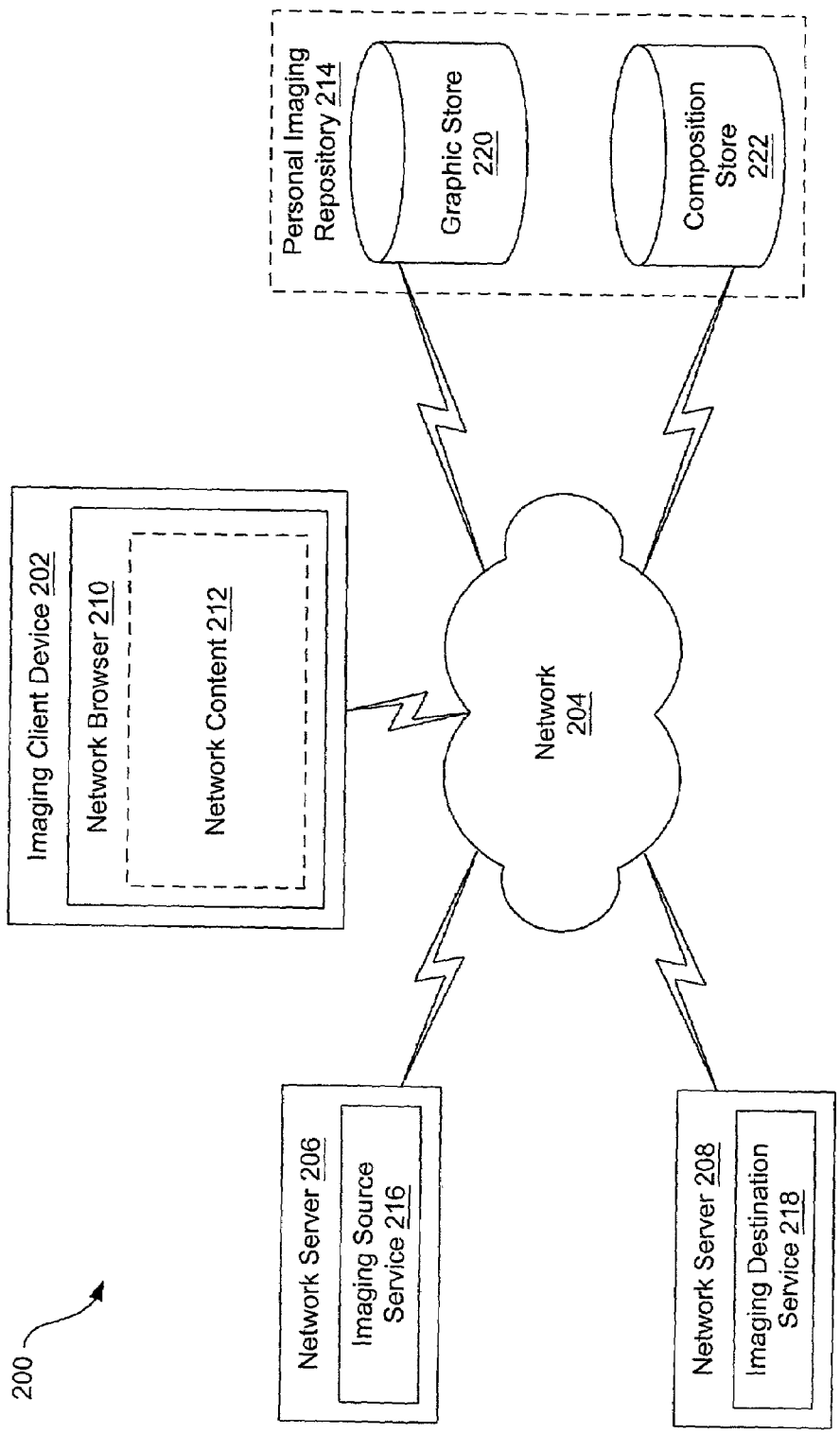
FIG. 2 is an example distributed system in which the invention can be implemented.

FIG. 2 illustrates an example distributed system 200 in which the invention can be implemented. As indicated in FIG. 2, the system 200 includes an imaging client device 202 that is coupled to a network 204. Through this coupling, the imaging client device 202, and therefore the imaging client (i.e., user), can be placed in communication with one or more network servers, such as servers 206 and 208. The client device 202 and network servers 206 and 208 represent any of a wide variety of conventional wired and/or wireless computing devices, such as desktop computers, portable computers, dedicated server computers, multi-processor computing devices, personal digital assistants (PDAs), mobile telephones, pen-based computers, gaming consoles, and so forth.

The network 204 represents one or more data distribution networks that can be used to communicate data and other information (e.g., control information) between or among various computing devices. Examples for the network 204 include the Internet, a local area network (LAN), a public or private wide area network (WAN), and combinations thereof. The network 204 can further include various different types of networks, including wired and/or wireless portions, employing any of a wide variety of different communications protocols including public and/or proprietary communications protocols.

During operation, the user can operate a network browser 210 executing on the imaging client device 202 to interact with imaging services 216, 218 executing on the network servers 206 and 208. As used herein, the term "services" refers to software and/or firmware components that can execute on one or more computing devices and which provide one or more particular functionalities to the imaging client device 202 such as imaging data selection and arrangement, data manipulation, printing, and so forth. As indicated in FIG. 2, the network browser 210 can receive network content 212 from one or more of the network servers 206 and 208. This content 212 typically includes various components such as, for example, text, graphics, and various commands (e.g., hypertext mark-up language (HTML), Java™, JavaScript™, etc.) and/or applications (e.g., Java™ applets). In use, the content 212 can, in some arrangements, facilitate communication with a personal imaging repository 214 so that the servers 206 and 208 can access data stored in the repository. Examples of the ways in which this communication can be facilitated are described below with reference to FIGS. 3 and 4.

The network server 206 executes an imaging source service 216 that, among other things, allows the user to interact with his or her personal imaging repository 214. The imaging source service 216 may actually provide multiple services that can be accessed. In some embodiments, these different services can provide different functionalities. For instance, one service may be responsible for graphic storage and retrieval while another service may be responsible for merging graphics in a single document. By accessing these services with the network browser 210, the user can select or identify imaging data that are to be stored as graphics in a graphic store 220 of the personal imaging repository 214. These graphics can be stored as individual files and generally can comprise any data capable of being represented as a two dimensional graphic. As is discussed below, the individual graphics in store 220 can be used as individual images that can be printed on appropriate print media, or multiple individual graphics can be compiled together as a single image for printing.

Irrespective of whether multiple graphics are to be used, the imaging source service 216 can be used to arrange the graphic(s) on a visual representation of a document to be created. Once the arrangement has been selected, the imaging source service 216 can store the arrangement as a composition (i.e., a composition image) in a composition store 222 of the personal image repository 214. It is to be noted that, although the graphic store 220 and the composition store 222 are illustrated as two separate stores, multiple such stores may exist in the system 200 and one or more graphic stores may be combined with one or more composition stores. Additionally, one or more of these stores 220 and 222 may be implemented on the imaging client device 202, one or more of the servers 206 or 208, or another designated computing device (not shown).

Once the graphics and composition have been selected, the image data can be processed or otherwise manipulated by accessing an imaging destination service 218 that executes on the network server 208. Where the colors of a document are to be adjusted, this service 218 can comprise a color adjustment service. This service may be closely associated with the printing device used to generate the document(s) and can, for example, be hosted by the printing device itself. In such a case, the server 208 may comprise an embedded server of the printing device. Irrespective of how the service is hosted, a request is communicated to the imaging destination service 218 and, upon receipt of the request, the network server 208 interacts with the graphic store 220 and composition store 222 to retrieve the data needed to facilitate color adjustment.

Figure 3:
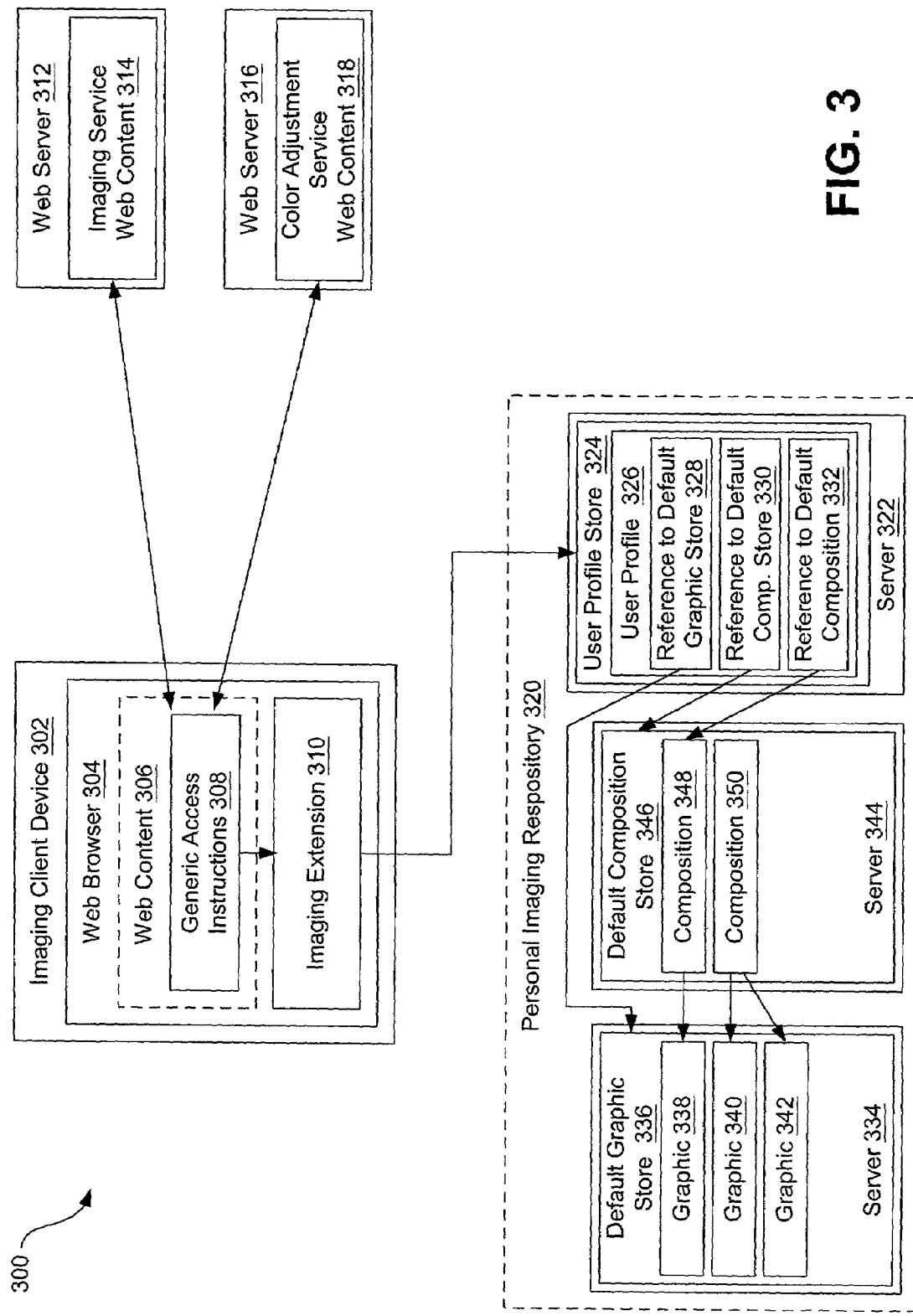
FIG. 3 is a first example web-based imaging system in which the invention can be implemented.

FIG. 3 illustrates a first example web-based imaging system 300 in which the invention can be implemented. As will be appreciated from the discussion that follows, this system 300 can be described as a client-based implementation in that much of the system functionality is provided by a client device. A similar system is described in detail in U.S. Pat. No. 7,062,752, entitled "A Method, System and Program Product for Multiprofile Operations and Expansive Profile Operation," by Shell Simpson, Ward Foster, and Kris Livingston, the disclosure of which is hereby incorporated by reference into the present disclosure.

As indicated in FIG. 3, the system 300 includes an imaging client device 302. The imaging client device 302 comprises a web browser 304 that is adapted to access web content 306 derived from imaging service web content 314 and color adjustment service web content 318 of web servers 312 and 316, respectively. The web content 306, like content 212, typically comprises text, graphics, and various commands. The commands can comprise one or more sets of executable instructions that are downloaded into the browser 304 to perform a service requested by the user. These instructions can be written in any suitable language including, for instance, HTML, Java™, JavaScript™, C-sharp, or other appropriate language. A variety of different functionalities can be served by the executable instructions. For example, the web content 306 normally includes executable instructions for causing target graphics, i.e. graphics provided by an accessed web site, to be displayed to the user.

In the embodiment shown in FIG. 3, the executable instructions are further used to access a personal imaging repository 320. These instructions typically comprise system-wide generic access instructions 308 that call on methods of an imaging extension 310 to access the personal imaging repository 320 and perform various web imaging operations. These instructions 308 are designated as "generic" because they are independent of the configuration of the user's personal imaging repository 320. As is discussed in greater detail below, the generic access instructions 308 can be used to, for example, add a graphic to a default graphic store 336 of the personal imaging repository 320, or add a new composition to a default composition store 346 of the repository.

As is further indicated in FIG. 3, the imaging extension 310 can form part of the browser 304. Although this arrangement is shown in the figure and described herein, the imaging extension 310 can, alternatively, be provided outside of the browser 304, for instance on a different device. Irrespective of its location, however, the imaging extension 310 is configured to respond to the execution of the generic access instructions 308 by generating/mapping to corresponding imaging client specific commands of the user. The imaging extension 310 typically is implemented as one or more application programming instructions (APIs) that, preferably, act as interfaces in accordance with a system-wide standard.

When executed, the generic access instructions 308 cause imaging extension calls (e.g., API calls) to be issued which, in turn, cause the imaging extension 310 (e.g., APIs) to access to the user's personal imaging repository 320. The web content 306 therefore uses the imaging extension 310 as a gateway to access the user's personal imaging repository 320. Generally speaking, the APIs can comprise sets of methods for establishing a destination for redirecting the browser 304 based on some form of received redirection initiation. In such circumstances, the process normally comprises receiving a redirection initiation to redirect the browser 304, retrieving a direct or indirect reference to a destination, and then causing the browser to browse to that destination. It will be recognized that there are many other ways (both in hardware and software) to implement this same functionality.

In some arrangements, the imaging extension 310 is configured to prevent the web content 306 (i.e., the executable instructions from one or more web services), from arbitrarily accessing the user's personal imaging repository 320. This restricted access can be imposed upon the web content 306 using a variety of methods. For example, an imaging extension API can be configured to only accept references from the web content 306 that were previously provided by the imaging extension 310. In such a scenario, the content 306 cannot arbitrarily supply references when calling the imaging extension API. Therefore, in order to access the user's personal imaging repository 320, the web content 306 must first obtain references using the imaging extension API.

The imaging extension 310 can be used to access one or more user profiles 326 that is/are stored in a user profile store 324 of a server 322 of the personal imaging repository 320. By way of example, the imaging extension 310 can be directed to the user profile 326 with a uniform resource locator (URL), pointer, socket, or other backroom detail. In some embodiments, the same user can have multiple user profiles. This may be particularly advantageous when a firewall (not shown) is used in that different graphic stores and composition stores can be used depending on whether the user is inside or outside of the firewall.

The user profile 326 typically includes references to all or a portion of the personal imaging repository 320 for that user profile. For instance, as shown in FIG. 3, the user profile 326 can include a reference 328 to a default graphic store, a reference 330 to a default composition store, and a reference 332 to a default composition. In use, the user profile 326 functions as a service that uses appropriate methods to create, modify, access, and cancel profiles. Accordingly, the imaging extension 310 maps to the appropriate methods (i.e., makes use of the methods) in the user profile 326 to obtain the reference to various repository items such as the default graphic store 336 and the default composition store 346.

Like the user profile store 324, the default graphic store 336 and default composition store 346 can reside on separate servers 334 and 344. It will be understood, however, that one or more of the stores could reside on a single machine, if desired. As indicated in FIG. 3, the default graphic store 336 is used to store various graphics, such as graphics 338, 340 and 342. These graphics can be stored in substantially any format. For example, these formats can comprise PDF, JPEG, PostScript, TIFF, GIF, BMP, etc. In addition, the default graphic store 336 can include one or more APIs. Therefore, in contrast to merely providing for graphic storage, the graphic store 336 can also provide services used to create, retrieve, and/or manipulate graphics. Furthermore, the default graphic store 336 can communicate with the web content of various web services. For example, color adjustment service web content 318 can request that one or more graphics be transmitted from the default graphic store.

The default composition store 346 stores various compositions, such as compositions 348 and 350, which can be used to arrange the selected graphics. Like the user profile store 324 and default graphic store 336, the default composition store 346 can also comprise various APIs that can access graphics from the graphic store, manipulate the graphics, etc.

Figure 4:
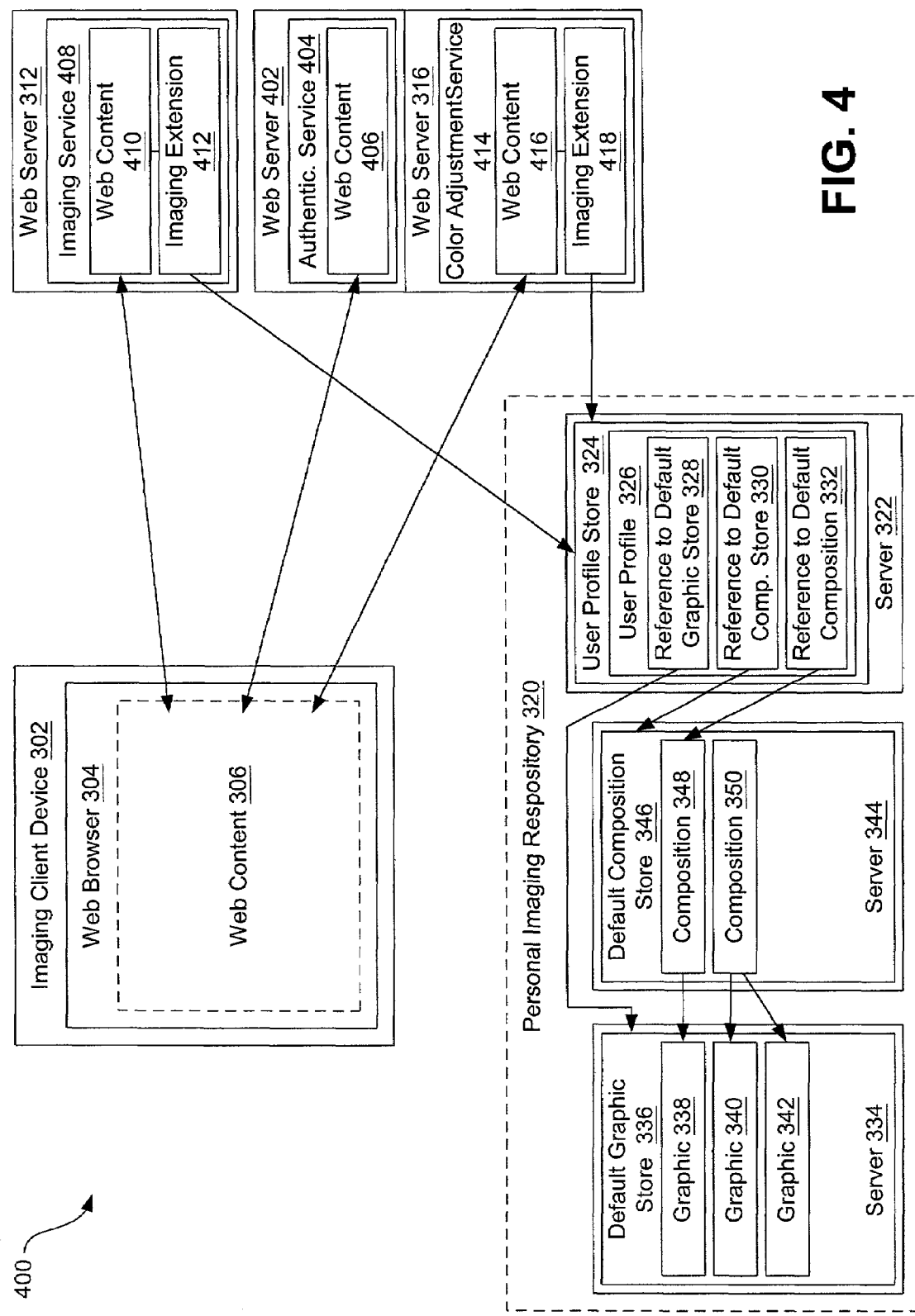
FIG. 4 is a second example web-based imaging system in which the invention can be implemented.

FIG. 4 illustrates a second example web-based imaging system 400 in which the invention can be implemented. As indicated in FIG. 4, the system 400 includes many of the features of the system 300 shown in FIG. 3. Therefore, the system 400 includes an imaging client device 302 that executes a web browser 304 to receive web content 306. The system 400 also includes a personal imaging repository 320 that can, for instance, comprise a user profile store 324, a default graphic store 336, and a default composition store 346. Furthermore, the system 400 includes web servers 312 and 316. Each of these components is generally configured in similar manner as the like-named and numbered features identified in FIG. 3. However, unlike the client-based system 300, the system 400 provides a server-based implementation in which much of the functionality provided by the client device 302 in the system 300 is transferred to another device. By way of example, this other device can comprise a further web server 402, which executes an authentication service 404. As shown in FIG. 4, the authentication service 404 comprises web content 406 (e.g., generated on the fly) that can be downloaded into the user's browser 304.

In addition to the above-noted differences, the servers 312 and 316 are provided with different software in the system 400 to permit alternative modes of operation. By way of example, the web server 312 can execute an imaging service 408, which includes web content 410 and an imaging extension 412. Similarly, the web server 316 can execute a color adjustment service 414 that includes web content 416 and an imaging extension 418. Like the web content 314 and 318 of the system 300, the web content 410 and web content 416 typically comprise text and graphics that can be downloaded into the user's browser 304. Unlike the system 300, however, generic access instructions need not be downloaded into the browser 304 in that the browser does not comprise its own imaging extension. Such an arrangement is advantageous where the client device 302 has limited storage capacity (e.g., for PDAs, mobile telephones). Instead, as identified above, the services 408 and 414 include their own imaging extensions 412 and 418 that can be used to access the user's personal imaging repository 320. By way of example, the content 410 and 416 comprise server-side code including one or more of PHP script, Java™ Servlets, Java™ server pages (JSPs), active server pages (ASPs), etc.

Each of the imaging extensions 412 and 418 typically has configurations that are similar to that of the imaging extension 310. Therefore, the imaging extensions 412 and 418 can comprise one or more APIs that, when executed, access to the user's personal imaging repository 320. Again, the APIs can comprise sets of methods for establishing a destination for redirecting the browser 304 based on some form of received redirection initiation. The APIs can implement, for instance, a URL, pointer, socket, or other backroom detail to facilitate the redirection.

The manner in which the personal imaging repository 320 is accessed by the services in the system 400 will now be discussed with reference to an example scenario. In this example, the user browses to the imaging service 408 using the web browser 304 of the client device 302. Upon reaching the service 408, web content 410 is executed to generate web pages that are downloaded to the web browser 304 (as content 306). Once this occurs, the browser 304 is redirected by the content 306 to the authentication service 404 that resides on the web server 402. Typically, this is accomplished by the web content 410 by generating a hypertext transfer protocol (HTTP) redirect that, when downloaded to the browser 304, causes the browser to redirect to an address (e.g., URL) identified in the header entry. Web content is then downloaded to the web browser 304 and the user is provided with an opportunity to complete an authentication procedure that identifies both the user's identity and the location of the user's personal imaging repository 320. The authentication procedure can, for example, comprise entry of authentication information, such a user name and password, that has been registered with the authentication service 404, for example, in a previous session. This information can be entered in a web page generated by the server 402. In an alternative arrangement, the authentication procedure can comprise the reading of a user identification card, which includes storage media (e.g. magnetic strip) that contains the user's authentication information. Persons having ordinary skill in the art will recognize that many other authentication alternatives exist.

Once the authentication procedure is successfully completed by the user, the browser 304 is again redirected, this time back to the imaging service 408. The redirection address (e.g., URL) used to revisit the imaging service 408 contains information that identifies the user and information identifying the user's personal imaging repository 320 (e.g., with a further URL). To avoid continual redirection back and forth, a "cookie" can be stored on the client device 302 that permits the authentication service 404 to validate the user's identity without requiring a further log in. Once this information is possessed by the imaging service 408, the service can, when appropriate, make calls to its imaging extension 412 (e.g., API calls) to command the imaging extension to access the user profile store 324 of the personal imaging repository 320. Through this access, the imaging service 408 can be used by the user to, for instance, select or identify imaging data to be stored as graphics in the default graphic store 336.

When the color adjustment service 414 is accessed, various content is downloaded to the web browser 306. The service 414 can then access the default graphic store 336 and default composition store 346 such that the graphics can be accessed and their arrangement on the document obtained.

Figure 5:
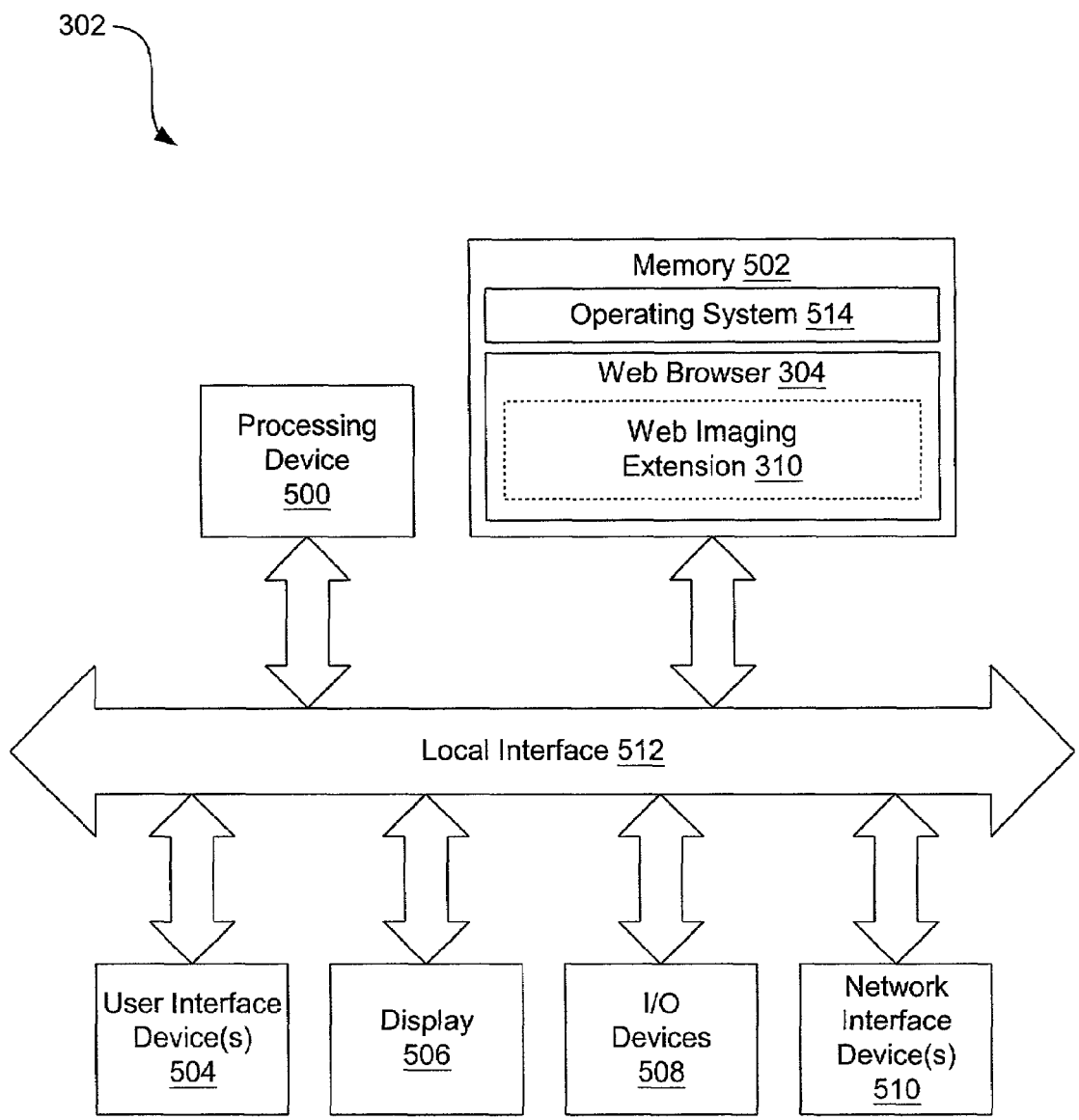
FIG. 5 is a schematic of an imaging client device shown in FIGS. 3 and 4.

FIG. 5 is a schematic view illustrating an example architecture for the imaging client device 302 identified in FIGS. 3 and 4. As identified above, the client device 302 can be any one of a wide variety of conventional wired and/or wireless computing devices, such as desktop computers, portable computers, dedicated server computers, multi-processor computing devices, cellular telephones, PDAs, handheld or pen-based computers, gaming consoles, and so forth. Irrespective its type, the client device 302 typically comprises a processing device 500, memory 502, one or more user interface devices 504, a display 506, one or more input/output (I/O) devices 508, and one or more networking devices 510, each of which is connected to a local interface 512.

The processing device 500 can include any custom made or commercially available processor, a central processing unit (CPU) or an auxiliary processor among several processors associated with the client device 302, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the client device 302. The memory 502 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 504 comprise those components with which the user can interact with the client device 302. For example, where the client device 302 comprises a personal computer (PC), these components can comprise a keyboard and mouse. Where the client device 302 comprises a handheld device (e.g., PDA, mobile telephone), these components can comprise function keys or buttons, a touch-sensitive screen, a stylus, etc. The display 506 can comprise a computer monitor or plasma screen for a PC or a liquid crystal display (LCD) for a handheld device.

With further reference to FIG. 5, the one or more I/O devices 508 are adapted to facilitate connection of the client device 302 to another device and may therefore include one or more serial, parallel, small computer system interface (SCSI), universal serial bus (USB), IEEE 1394 (e.g., Firewire™), and/or personal area network (PAN) components. The network interface devices 510 comprise the various components used to transmit and/or receive data over a network (e.g., network 204 in FIG. 2). By way of example, the network interface devices 510 include a device that can communicate both inputs and outputs, for instance, a modulator/demodulator (e.g., modem), wireless (e.g., radio frequency (RF)) transceiver, a telephonic interface, a bridge, a router, network card, etc.

The memory 502 normally at least comprises an operating system 514 and a web browser 304. The operating system 514 controls the execution of other software and provides scheduling, input-output control, file and data management, memory management, and communication control and related services. As noted above with reference to FIGS. 3 and 4, the web browser 304 comprises software and/or firmware that is used to access various services over a network (e.g., Internet) and, therefore, download content from various different sources. Where the web browser 304 is configured as indicated in FIG. 3, the browser can comprise an imaging extension 310. However, it will be understood that where the system is arranged as indicated in FIG. 4, the imaging extension 310 need not be provided in the browser 304.

The architecture of the various servers shown in FIGS. 3 and 4 are typically similar to that described above with reference to FIG. 5. Therefore, separate figures are not provided for these servers. Regardless, however, persons having ordinary skill in the art will recognize the various different architectures that could be used for the construction of the servers.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, operation of the systems will now be discussed. In the discussions that follow, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 6:
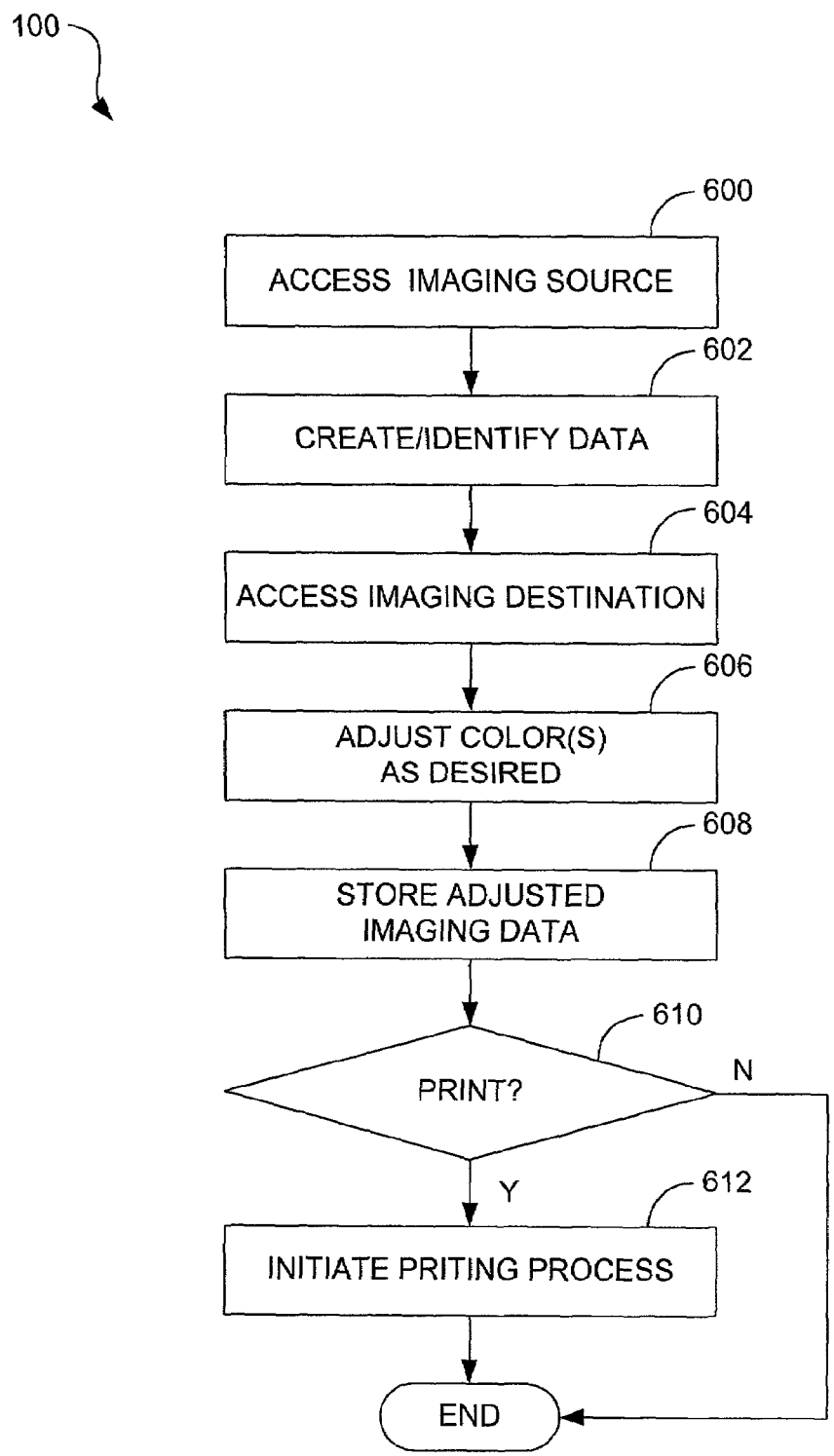
FIG. 6 is a flow diagram that provides an overview of the manner in which the inventive system can be used to adjust colors in a document prior to printing.

FIG. 6 provides an overview of an example of the manner in which the inventive system can be used to adjust colors of a document before printing. As indicated in block 600, an imaging source 102 is first accessed by the user. Once the source is accessed, the user creates or identifies data that are to be used to generate one or more hard copy documents, as indicated in block 602. By way of example, data can be created/identified with a suitable user application, such as a drawing or word processing application. Where the data are created by the user, the user may further select the arrangement (i.e., composition) of the data. Notably, the data may include text as well as one or more graphics.

At this point, an imaging destination 104 can be accessed, as indicated in block 604. By way of example, the imaging destination 104 comprises a network-based (e.g., web-based) color adjustment service that comprises part of or is associated with a printing service. Alternatively, the imaging destination 104 can comprise a separate service that is capable of facilitating color adjustment. Once the imaging destination 104 is accessed, the user can adjust one or more colors represented by the imaging data (e.g., a document) as desired, as indicated in block 606. This adjustment can be facilitated in various different ways, as is explained below.

Once the adjustment(s) has/have been made, the adjusted imaging data (e.g., document) can be stored. By way of example, these data can be stored in the user's personal imaging repository 320. At this point, it can be determined whether the imaging data are to be printed, as indicated in decision element 610. If not, flow is terminated and the user will have an opportunity to print the imaging data at another time. If the user does wish to print, however, flow continues to block 612 at which the printing process is initiated.

Figure 7:
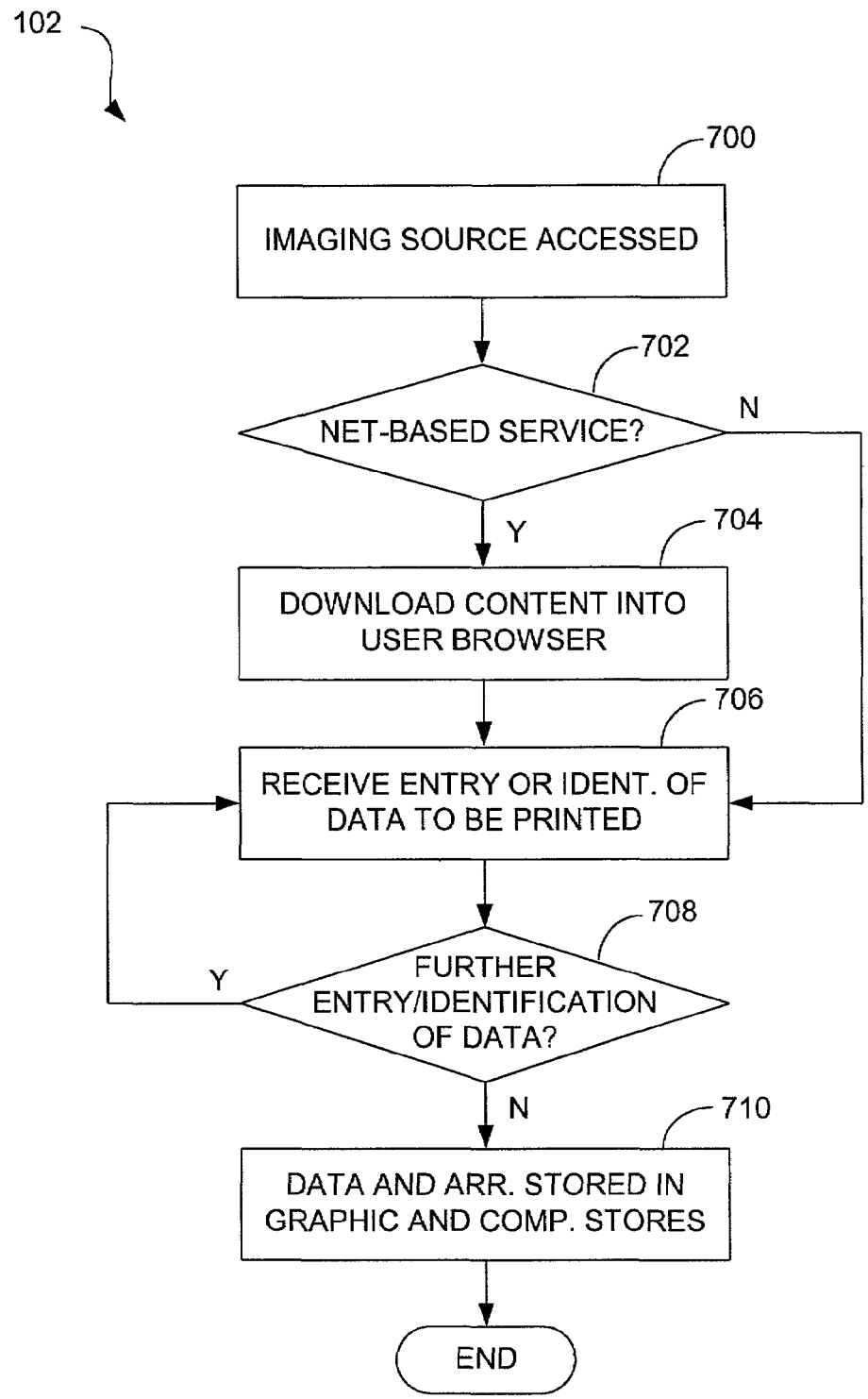
FIG. 7 is a flow diagram of an example of using an imaging source to create and/or identify data to be printed.

Referring now to FIG. 7, an example of use of an imaging source 102 to create and/or identify data to be printed is provided. The imaging source 102 can have various different arrangements. By way of example, the imaging source 102 can simply comprise a local application (e.g., drawing or design application) that executes on the client device 302. In another example, the imaging source 102 can comprise a network-based (e.g., web-based) service with which data can be created, identified, and/or arranged by the user. Notably, regardless of the nature of imaging source 102, the source need not be configured to permit the user to identify colors with precision, e.g., by identifying one or more specific named colors (e.g., Pantone™ colors). Where the imaging source 102 comprises a network-based service, the user may access the source with a browser 304. In such a scenario, the service typically comprises a web site that is accessed via the Internet.

Irrespective of its configuration, the imaging source 102 is first accessed by the user, as indicated in block 700. The operation from this point forward may, however, depend upon whether the imaging source 102 is a local application or a network-based service. Referring to block 702, if the imaging source 102 is not a network-based service, flow continues down to block 706 described below. If, on the other hand, the imaging source 102 is a network-based service, flow continues to block 704 at which the imaging source 102 downloads content 306 into the user browser. As noted above, this content 306 normally includes various text and/or graphics that are displayed to the user to facilitate interfacing between the user and the service. As described above with reference to FIG. 3, this content 306 can, optionally, include generic access instructions 308 that call on methods of an imaging extension 310 of the browser 304 to perform various web imaging operations.

After the imaging source 102 has been accessed, the source can receive entry or identification of data (i.e., graphics), as indicated in block 706. For example, the imaging source 102 can receive data manually entered by the user via the user interface devices 504 of the client device 302. Alternatively, the user can identify the location of data (e.g., a formerly created document) that resides in memory 502 of the client device 302 or in a network-accessible location remote from the device memory. Once the data have been received and/or identified, it can be determined whether further data are to be entered and/or identified, as indicated in decision element 708. If further data are to be entered and/or identified, flow returns to 706 at which these data are received. If no further data are to be entered and/or identified, however, flow continues on to block 710 at which the received data, as well as the arrangement (i.e., composition) of the data, are stored within the personal imaging repository 320. More specifically, the data can be stored within the graphic store 336 and the arrangement of the data can be stored within the composition store 346. Although the data and arrangement (i.e., imaging data) have been described as being stored in separate "stores," persons having ordinary skill in the art will appreciate that the data and their arrangement could be stored within a single "store."

Where the imaging source 102 is a network-based service, storage of the imaging data can be facilitated through use of the imaging extension 310 stored in the user browser 304 and/or an imaging extension 412 stored on web server 408. In the former case, the content 306 downloaded to the browser 304 makes a call (e.g., API call) to the imaging extension 310 to, in turn, cause a call to be made to the user profile store 324 that contains the user profile 326. Through this call, the default graphic store 336 can be accessed and various graphics can be stored therein.

In the example system 400 of FIG. 4, storage of the imaging data is accomplished through use of the imaging extension 412. In particular, when the imaging source 102 was first accessed, the user's browser 304 can have been redirected by the content 306 downloaded into the browser to an authentication service and the user provided with an opportunity to complete an authentication procedure that identifies both the user's identity and the location of the user's personal imaging repository 320. Once the authentication procedure has been successfully completed, the browser 304 is again redirected and the user information, or at minimum the location of the user profile 326, is supplied to the print service. With this information, the service can then access the user's personal imaging repository 320 by making a call to the imaging extension 412 to command the imaging extension to make a call to the user profile store 324 of the personal imaging repository 320. It is noted that, although use of an imaging extension is specifically identified, persons having ordinary skill in the art will appreciate that, alternatively, the service can directly call the user profile store 324. In such a case, the service can, for instance, use a collection of stubs that are configured to call various elements of the personal imaging repository 320.

It is to be noted that the graphic store 336 and/or composition store 346 can, in some arrangements, form part of or be supported by the imaging source 102. Accordingly, where the imaging source 102 comprises a local application, the stores 336, 346 may be located within memory 502 of the client device 302. Where the imaging source 102 comprises a network-based service, the stores 336, 346 may be located on one or more servers that are accessible over the network 204.

Figure 8A:
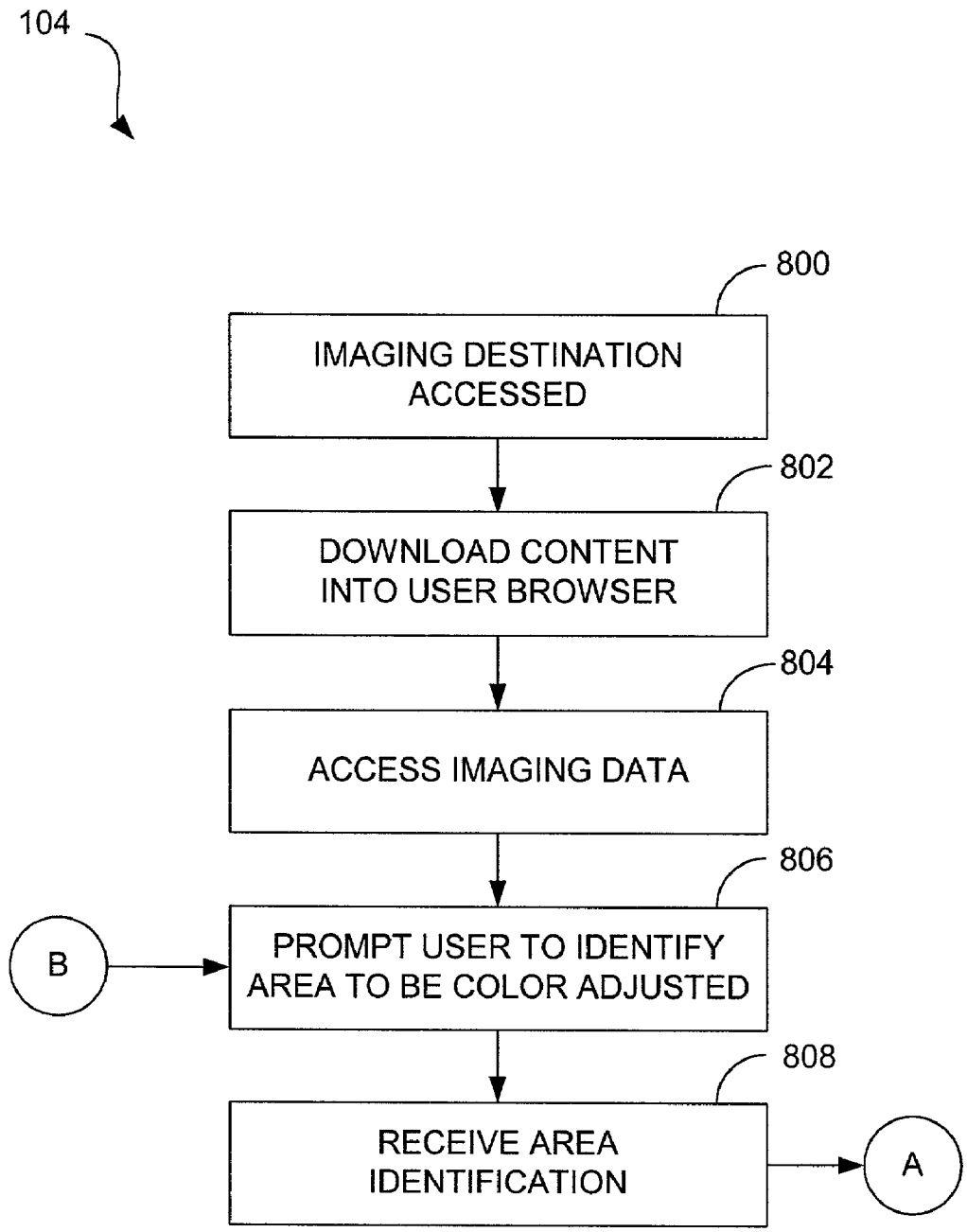
FIGS. 8A and 8B provide a flow diagram illustrating an example of operation of an image destination in providing color adjustment services.
Figure 8B:
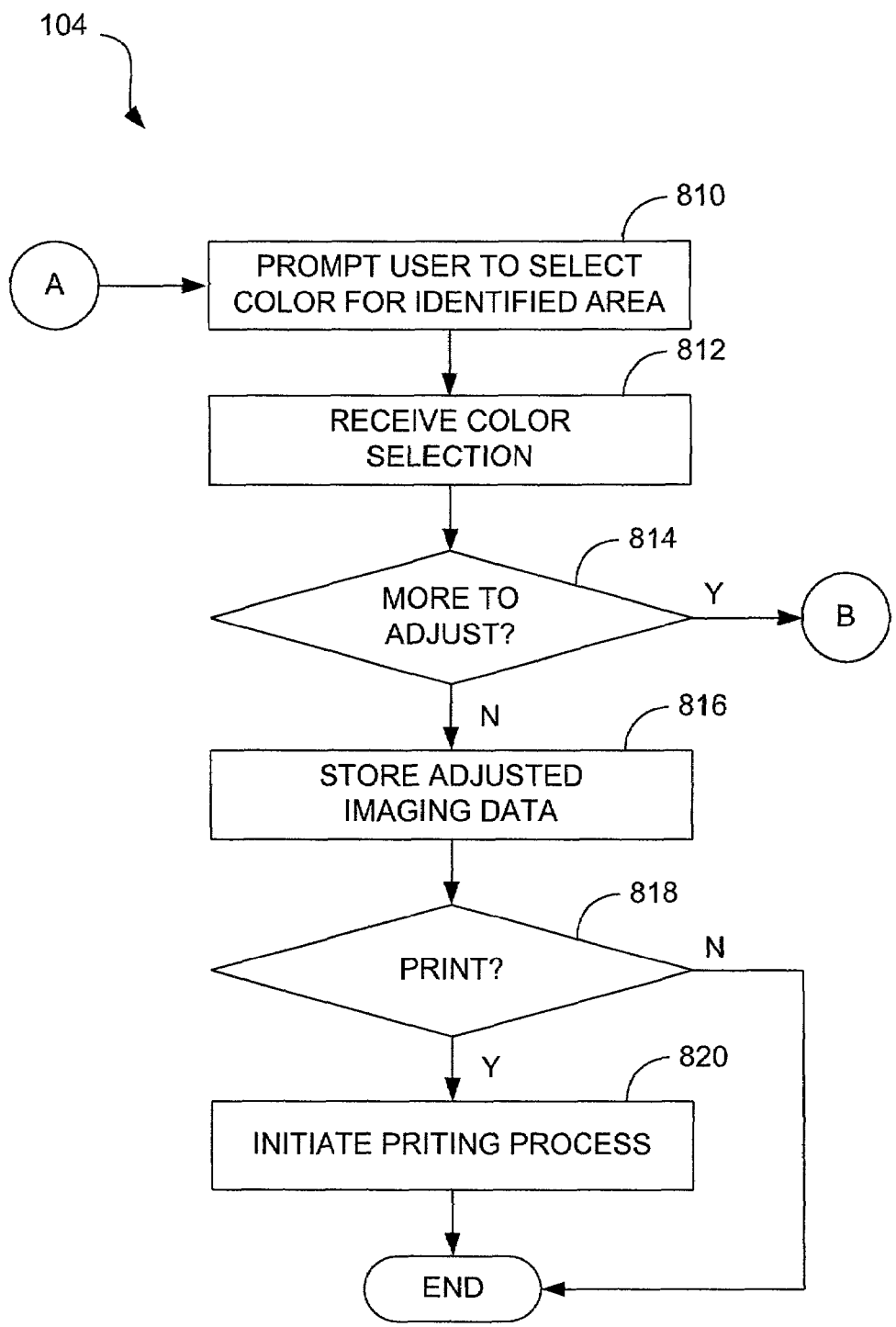

FIGS. 8A and 8B provide an example of operation of an imaging destination 104 in providing color adjustment services to a user. As noted above, the imaging destination 104 can comprise a color adjustment service that is part of or is associated with a printing service. Alternatively, the color adjustment service can be independent from any printing service. Typically, however, the imaging destination 104 (i.e., service) is closely associated with the printing device that is going to be used to print the imaging data such that the service has knowledge of the printing device's capabilities (e.g., ability to print precise, predefined colors).

Beginning with block 800 of FIG. 8A, the imaging destination 104 is first accessed. Typically, this access is achieved by browsing to the imaging destination over a network. By way of example, the imaging destination 104 is a color adjustment service that includes a web site that is accessed via the Internet. Where the imaging source 102 comprises a network-based service, arrival at the imaging destination 104 can have been effected by selecting an appropriate button from an imaging source web site.

Once the color adjustment service is accessed, it downloads content 306 into the user's browser 304, as indicated in block 802. This content 306 normally includes various text and/or graphics that are displayed to the user to facilitate interfacing between the user and the service. Where the system is arranged as shown in FIG. 3, the content 306 can also include generic access instructions 308 that call on methods of the imaging extension 310 of the browser 304 so that the user's personal imaging repository 320 can be accessed. Where the system is arranged as shown in FIG. 4, the imaging extension 418 of the imaging destination can be used to access the personal imaging repository 320. In this latter case, the imaging extension 418 knows the location of the personal imaging repository 320 from information provided to the imaging destination with, for example, a redirection address (e.g., URL).

Next, the color adjustment service accesses the imaging data (e.g., document) that are to be printed, as indicated in block 804. Where the imaging source 102 comprises a local application that executes on the client device 302, this access can be facilitated by entry by the user of the location of a document to be printed. Alternatively, where the imaging source 102 comprises a network-based service, the color adjustment service can gain access by automatic reference to the user's personal imaging repository 320 using an imaging extension 310 or 418. Assuming the user had just created and/or identified the document(s) using a network-based service, the imaging data comprises the default graphics and default composition that were stored by the network-based service.

By accessing the imaging data in the personal imaging repository 320, the color adjustment service can, for instance, retrieve the imaging data so that the various adjustments can be made to the data. Such retrieval can be accomplished using the methods described above with regard to FIGS. 1–4. Once the imaging data have been accessed (e.g., retrieved), the color adjustment service can prompt the user to identify one or more areas to be color adjusted, as indicated in block 806. By way of example, the user can be presented with a representation of the document and asked to "click" on the areas that are to be adjusted. Alternatively, the user can be asked to draw a "box" around the area containing a color to be adjusted. In such a case, the service can be configured to automatically recognize multiple areas that have the same color. Although two example identification methods have been explicitly identified, persons having ordinary skill in the art will appreciate that there are many ways in which the areas to be adjusted can be identified, all of which are considered within the scope of the present disclosure.

Irrespective of how the identification is made, the color adjustment service can receive the identification, as indicated in block 808. At this point, flow continues to block 810 of FIG. 8B. As identified in this block, the color adjustment service can then prompt the user to select the color that is to be used in the identified area. By way of example, the user can indicate the color selection be selecting from a drop down menu of colors that is accessed by selecting a "color" button that is provided on a web page presented to the user with the user browser 304. Alternatively or in addition, the various color choices can be made available to the user by, for instance, "right clicking" on the selected area to cause a drop down menu to appear. In the latter scenario, this functionality can be facilitated by an application (e.g., Java™ applet) that was downloaded into the user browser 304 along with the various content in block 802. The various colors can be identified by color alone and/or can be identified by a color code, such as a Pantone™ color code, which identifies an absolute color. Operating in this manner, the user can obtain the exact color he or she desires, regardless of the capabilities of the imaging source 102 that was used to create the imaging data (e.g., document).

Once the color selection has been identified, the selection is received, as indicated in block 812, and it can be determined whether more color adjustments are to be made, as indicated in decision element 814. If more adjustments are to be made, flow returns to block 806 of FIG. 8A described above. If, on the other hand, all desired adjustments have been made, the adjusted imaging data are stored, as indicated in block 816. As noted above, these data can be stored in the user's personal imaging repository 320 in similar manner to that used to store data with an imaging source 102. Then, it can be determined whether the imaging data are to be printed, as indicated in decision element 818. If not, flow is terminated and the user may print the adjusted imaging data at another time by accessing an appropriate printing destination. If the user does wish to print, however, flow continues to block 820 at which the printing process is initiated. This initiation can comprise redirecting the user browser 304 to a printing service or, where the color adjustment service is hosted by a printing device, merely internally starting the printing process.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for facilitating color adjustment of imaging data, comprising:
    downloading content from a color adjustment web service to a user web browser, the content including generic access instructions;
    the web service accessing imaging data to be printed using an imaging extension that forms part of the user web browser, the imaging extension being called upon by the generic access instructions to access the imaging data;
    the web service presenting the imaging data to the user in the web browser;
    the web service prompting the user to select an area to be adjusted and a color that the area is desired to be;
    the web service receiving the area and color selections; and
    the web service adjusting the color of the area as desired.

2. The method of claim 1, wherein adjusting the color comprises changing the area to a specific named color.

3. The method of claim 1, further comprising storing the adjusted imaging data in a store that is accessible over a network.

4. The method of claim 1, further comprising storing the adjusted imaging data within a printing device that is to be used to print the adjusted imaging data.

5. The method of claim 1, further comprising facilitating printing of the adjusted imaging data.

6. The method of claim 1, wherein prompting the user to select an area to be adjusted comprises prompting the user to click on an area to be adjusted.

7. The method of claim 1, wherein prompting the user to select an area to be adjusted comprises prompting the user to draw a box around the area containing a color to be adjusted.

8. The method of claim 1, wherein the color adjustment web service is hosted by a printer and, therefore, the printer performs the downloading, accessing, presenting, prompting, receiving, and adjusting actions.

9. A color adjustment web service that is configured to facilitate adjustment of the colors of imaging data, the web service comprising:
    logic configured to download content to a user web browser, the content including generic aceess instructions;
    logic configured to access imaging data to be printed using an imaging extension that forms part of the user web browser, the imaging extension being called up on by the generic acces instructions to acces imaging data;
    logic configured to present the imaging data to the user in the web browser;
    logic configured to prompt the user to select an area to be adjusted and a color that the area is desidered to be;
    logic configured to receive area and color selections of a user; and
    logic configured to adjust the color of the area as desired.

10. The service of claim 9, wherein the color comprises a specific named color.

11. The service of claim 9, wherein the color adjustinein web service is hosted by a printer and, therefore, the printer comprises the logic configured to download, access, present prompt, receive, and adjust.

* * * * *

UNITED STATES PATENT AND TRADEMARK OFFICE
CERTIFICATE OF CORRECTION

PATENT NO. : 7,145,692 B2 Page 1 of 1
APPLICATION NO. : 10/071773
DATED : December 5, 2006
INVENTOR(S) : Shell Sterling Simpson et al.

It is certified that error appears in the above-identified patent and that said Letters Patent is hereby corrected as shown below:

In column 14, line 38, in Claim 9, delete "aceess" and insert -- access --, therefor.

In column 14, line 42, in Claim 9, delete "up on" and insert -- upon --, therefor.

In column 14, line 43, in Claim 9, after "generic" delete "acces" and insert -- access --, therefor.

In column 14, line 43, in Claim 9, after "to" delete "acces" and insert -- access --, therefor.

In column 14, line 43, in Claim 9, insert -- the -- before "imaging".

In column 14, line 47, in Claim 9, delete "desidered" and insert -- desired --, therefor.

In column 14, line 54, in Claim 11, delete "adjustinein" and insert -- adjustment --, therefor.

In column 14, line 56, in Claim 11, delete "present" and insert -- present. --, therefor.

Signed and Sealed this

Eleventh Day of August, 2009

David J. Kappos
*Director of the United States Patent and Trademark Office*